United States Patent
Suzuki et al.

(10) Patent No.: US 9,272,957 B2
(45) Date of Patent: Mar. 1, 2016

(54) PROCESS FOR PRODUCING ALUMINUM TITANATE-BASED CERAMICS FIRED BODY

(75) Inventors: Keiichiro Suzuki, Niihama (JP); Masayuki Narumi, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 896 days.

(21) Appl. No.: 13/499,183

(22) PCT Filed: Sep. 29, 2010

(86) PCT No.: PCT/JP2010/066937
§ 371 (c)(1),
(2), (4) Date: Jun. 11, 2012

(87) PCT Pub. No.: WO2011/040457
PCT Pub. Date: Apr. 7, 2011

(65) Prior Publication Data
US 2012/0241998 A1 Sep. 27, 2012

(30) Foreign Application Priority Data

Oct. 1, 2009 (JP) ................................. 2009-229736

(51) Int. Cl.
| C04B 35/638 | (2006.01) |
| C04B 35/478 | (2006.01) |
| C04B 35/64 | (2006.01) |
| C04B 38/06 | (2006.01) |
| C04B 38/00 | (2006.01) |
| C04B 111/00 | (2006.01) |

(52) U.S. Cl.
CPC ............ *C04B 35/478* (2013.01); *C04B 35/638* (2013.01); *C04B 38/0006* (2013.01); *C04B 2111/0081* (2013.01); *C04B 2111/00793* (2013.01); *C04B 2235/3206* (2013.01); *C04B 2235/3217* (2013.01); *C04B 2235/3222* (2013.01); *C04B 2235/3232* (2013.01); *C04B 2235/3418* (2013.01); *C04B 2235/5436* (2013.01); *C04B 2235/6584* (2013.01); *C04B 2235/80* (2013.01)

(58) Field of Classification Search
CPC ..................... C04B 35/478; C04B 2235/6583; C04B 2235/6584
See application file for complete search history.

(56) References Cited

U.S. PATENT DOCUMENTS

| 6,107,638 | A | * | 8/2000 | Sumino ................. C04B 35/593 257/43 |
| 7,976,768 | B2 | | 7/2011 | Brady et al. |
| 8,309,012 | B2 | * | 11/2012 | Okazaki ....................... 264/630 |
| 2006/0035107 | A1 | * | 2/2006 | Natsuhara ............. C04B 35/581 428/650 |
| 2007/0006561 | A1 | | 1/2007 | Brady et al. |
| 2007/0224110 | A1 | | 9/2007 | Fukuda et al. |
| 2008/0286179 | A1 | * | 11/2008 | Liu et al. ....................... 422/310 |
| 2011/0077143 | A1 | | 3/2011 | Tohma et al. |
| 2011/0195838 | A1 | | 8/2011 | Brady et al. |

FOREIGN PATENT DOCUMENTS

| JP | 2008-545612 A | 12/2008 |
| JP | 2009-196880 A | 9/2009 |
| JP | 2010-001184 A | 1/2010 |
| WO | 2005/105704 A1 | 11/2005 |

OTHER PUBLICATIONS

Low et al. "Effect of grain size and controlled atmospheres on the thermal stability of aluminum titanate". AIP Conference Proceedings 1202, 27 (Jan. 2010).*
Low et al. "Effect of atmospheres on the thermal stability of aluminum titanate". Physica B 385-386 (Nov. 2006), pp. 502-504.*
Extended European Search Report issued on Feb. 27, 2013 in corresponding European Patent Application No. 10820572.5.

* cited by examiner

*Primary Examiner* — Erin Snelting
(74) *Attorney, Agent, or Firm* — Sughrue Mion, PLLC

(57) ABSTRACT

The present invention aims to provide a process for producing an aluminum titanate-based ceramics fired body wherein a cracking of a ceramics shaped body during a degreasing step is suppressed and also sufficient mechanical strength for handling is provided to the ceramics shaped body for such a case of the transfer from a degreasing step to a firing step. The present invention is a process for producing an aluminum titanate-based ceramics fired body comprising a shaping step of obtaining a ceramics shaped body by shaping a starting material mixture containing inorganic components including an aluminum source powder and a titanium source powder and organic components; a degreasing step for removing the organic components contained in the ceramics shaped body in atmosphere with an oxygen concentration of not higher than 0.1% and under the temperature condition that the highest temperature is not lower than 700° C. and not higher than 1100° C.; and a firing step for firing the ceramics shaped body under the temperature condition that the highest temperature is not lower than 1300° C.; in this order, wherein the atmosphere at a heating step to 1300° C. during the firing step has an oxygen concentration of not lower than 1% and not higher than 6%.

13 Claims, No Drawings

PROCESS FOR PRODUCING ALUMINUM TITANATE-BASED CERAMICS FIRED BODY

CROSS REFERENCE TO RELATED APPLICATIONS

This application is a National Stage of International Application No. PCT/JP2010/066937 filed Sep. 29, 2010, claiming priority based on Japanese Patent Application No. 2009-229736 filed Oct. 1, 2009, the contents of all of which are incorporated herein by reference in their entirety.

TECHNICAL FIELD

The present invention relates to a process for producing a fired body comprising aluminum titanate-based ceramics and more particularly a process for producing a fired body comprising aluminum titanate-based ceramics by firing a shaped body of a starting material mixture containing an aluminum source powder and a titanium source powder.

BACKGROUND ART

Aluminum titanate-based ceramics are ceramics containing titanium and aluminum as constitutive elements and having a crystal pattern of aluminum titanate in an x-ray diffraction spectrum. Aluminum titanate-based ceramics have been known as ceramics being excellent in heat resistance and having low thermal expansibility. Aluminum titanate-based ceramics have conventionally been used as firing tools such as crucibles. Recently, the utility value of aluminum titanate-based ceramics in industrial fields is increasing as a material for constituting a ceramics filter (DPF: Diesel particulate filter) for collecting fine carbon particles contained in exhaust gases discharged from an internal combustion engine such as a diesel engine.

A process known for producing such an aluminum titanate-based ceramics comprises firing a starting material mixture containing a powder of a titanium source compound such as titania and a powder of an aluminum source compound such as alumina (see, Patent Document 1).

PRIOR ART DOCUMENTS

Patent Documents

Patent Document 1: WO 05/105704

SUMMARY OF THE INVENTION

Problems to be Solved by the Invention

A conventional degreasing step for producing ceramics shaped body has had a problem that the shaped body tends to crack easily during the step. The ceramics shaped body becomes easier to crack as the shaped body becomes larger. In addition, in the case where a ceramics shaped body after degreasing is transferred from the degreasing step to a firing step, the shaped body has a problem of low mechanical strength and is thus very difficult for handling.

Thus, the present invention aims to provide a process for producing an aluminum titanate-based ceramics fired body wherein a cracking of a ceramics shaped body during a degreasing step is suppressed and also sufficient mechanical strength for handling is provided to the ceramics shaped body for such a case of the transfer from a degreasing step to a firing step.

Solutions to the Problems

The present inventors made investigations and found that the oxygen concentration during a conventional degreasing step of a ceramics shaped body is higher than 0.1%, thereby making the shaped body easy to crack because of the combustion of organic components such as a binder and a pore-forming agent contained in a starting material mixture. Also the decrease in mechanical strength of the ceramics shaped body after organic substance combustion is supposedly attributed to the removal of the binder component.

The present invention is to provide a process for producing an aluminum titanate-based ceramics fired body comprising a shaping step to obtain a ceramics shaped body by shaping a starting material mixture containing inorganic components comprising an aluminum source powder and a titanium source powder and organic components; a degreasing step for removing the organic components contained in the ceramics shaped body in an atmosphere with an oxygen concentration of not higher than 0.1% and under the temperature condition that the highest temperature is not lower than 700° C. and not higher than 1100° C.; and a firing step for firing the ceramics shaped body under the temperature condition that the highest temperature is not lower than 1300° C.; in this order, wherein the atmosphere at a heating step to 1300° C. during the firing step has an oxygen concentration of not lower than 1% and not higher than 6%.

The ceramics shaped body is preferably kept at the highest temperature for the degreasing step during the degreasing step and the ceramics shaped body is preferably kept at the highest temperature for the firing step during the firing step.

The ceramics shaped body is preferably fired in the atmosphere with an oxygen concentration higher than 5% after the heating step to 1300° C. during the firing step.

The inorganic components preferably further contain a magnesium source powder and a silicon source powder.

The total amount of the organic components contained in the ceramics shaped body is preferably not less than 10 parts by mass and less than 50 parts by mass based on 100 parts by mass of the total ceramics shaped body.

The organic components preferably contain a pore-forming agent, and the pore-forming agent is preferably polyethylene, corn starch, or potato starch.

The ceramics shaped body is preferably in honeycomb structure and the cross-sectional area of the bottom face of the shaped body is not smaller than 78.5 cm$^2$, and the height of the shaped body is not lower than 5 cm in the arrangement during the degreasing step.

A portion of the organic components is preferably removed and the remaining portion is preferably carbonized during the degreasing step.

Preferably, in the above-mentioned inorganic components, (i) the molar ratio of the aluminum source powder expressed on $Al_2O_3$ basis to the titanium source powder expressed on $TiO_2$ basis is 35/65 to 45/55, (ii) the molar ratio of the magnesium source powder expressed on MgO basis to the total amount of the aluminum source powder expressed on $Al_2O_3$ basis and the titanium source powder expressed on $TiO_2$ basis is 0.03 to 0.15 or (iii) the content of the silicon source powder expressed on $SiO_2$ basis relative to 100 parts by mass of the total amount of the aluminum source powder expressed on $Al_2O_3$ basis and the titanium source powder expressed on $TiO_2$ basis is 0.1 to 10 parts by mass.

Advantages of the Invention

In the production process of the present invention, the oxygen concentration at the time of heating (degreasing step)

is controlled to be not higher than 0.1%, thereby suppressing heat generation from organic substances and cracking after degreasing. Trace of carbon remains in a ceramics shaped body after the degreasing step (before firing), thereby increasing the mechanical strength of the shaped body and making the ceramics shaped body easy to be transferred to the firing step.

In addition, by increasing the highest temperature during the degreasing step from conventional 600 to 700° C. to the range of 700 to 1100° C., the ceramics shaped body becomes easy to be transferred to the firing step since the mechanical strength of the ceramics shaped body after the degreasing step increases owing to grain growth.

MODE FOR CARRYING OUT THE INVENTION

<Process for Producing Aluminum Titanate-Based Ceramics Fired Body>

An aluminum titanate-based ceramics fired body of the present invention is produced by degreasing and firing a shaped body of a starting material mixture containing inorganic components including an aluminum source powder and a titanium source powder and organic components. An aluminum titanate-based ceramics fired body obtained by using such a starting material mixture is a fired body comprising an aluminum titanate-based crystal.

An aluminum source powder contained in the starting material mixture to be provided for the present invention is a powder of a substance to be led to an aluminum component constituting an aluminum titanate-based ceramics fired body. Examples of the aluminum source powder include a powder of alumina (aluminum oxide). Alumina may be crystalline or amorphous. In the case where alumina is crystalline, the crystal type of alumina includes γ-type, δ-type, θ-type, and α-type. Particularly, α-type alumina is preferably used out of them.

The aluminum source powder may be a powder of a substance to be led to alumina by firing in the air. Examples of such a substance include an aluminum salt, an aluminum alkoxide, aluminum hydroxide, and metal aluminum.

The aluminum salt may be a salt with inorganic acids or a salt with organic acids. Specific examples of the inorganic salt include aluminum nitrates such as aluminum nitrate and ammonium aluminum nitrate; and aluminum carbonates such as ammonium aluminum carbonate. Examples of the aluminum organic salt include aluminum oxalate, aluminum acetate, aluminum stearate, aluminum lactate, and aluminum laurate.

Specific examples of the aluminum alkoxide include aluminum isopropoxide, aluminum ethoxide, aluminum sec-butoxide, and aluminum tert-butoxide.

The aluminum hydroxide may be crystalline or amorphous. In the case where aluminum hydroxide is crystalline, examples of crystal types thereof include gibbsite type, bayerite type, nordstrandite type, boehmite type, and pseudoboehmite type. Examples of the amorphous aluminum hydroxide include aluminum hydrolysate obtained by hydrolyzing an aqueous solution of a water-soluble aluminum compound such as an aluminum salt or an aluminum alkoxide.

In the present invention, as the aluminum source powder, one kind may be used solely and two or more kinds may be used in combination.

Out of the substances, as the aluminum source powder, an alumina powder is preferable, and an α-type alumina powder is more preferable. Note that the aluminum source powder may contain trace components derived from the raw materials or inevitably contained in the production process.

As the aluminum source powder, a commercialized product may be used as it is, and a commercialized aluminum source powder may be used after being subjected to the following treatments.

(a) Classification of a commercialized aluminum source powder by sieving and the like (b) Granulation of a commercialized aluminum source powder by a granulator and the like In the present invention, the aluminum source powder to be used preferably has a particle diameter corresponding to a cumulative percentage of 50% on a volume basis (D50) of not smaller than 20 μm and not larger than 60 μm, which is measured by laser diffractometry. By adjusting the D50 of an aluminum source powder within the range, an aluminum titanate-based ceramics fired body exhibiting an excellent porous property can be obtained and also the firing contraction rate can be efficiently lowered. The D50 of the aluminum source powder is more preferably not smaller than 25 μm and not larger than 60 μm and even more preferably not smaller than 30 μm and not larger than 60 μm.

A titanium source powder contained in the starting material mixture is a powder of a substance to be led to a titanium component constituting an aluminum titanate-based ceramics fired body. Examples of such a substance include a powder of titanium oxide. Examples of the titanium oxide include titanium(IV) oxide, titanium(III) oxide, and titanium(II) oxide, and preferably titanium(IV) oxide is used. Titanium (IV) oxide may be crystalline or amorphous. In the case where titanium(IV) oxide is crystalline, examples of the crystal type include anatase type, rutile type, and brookite type. The anatase type and rutile type titanium(IV) oxide is more preferable.

The titanium source powder to be used in the present invention may be a powder of a substance to be led to titania (titanium oxide) by firing in the air. Examples of such a substance include a titanium salt, a titanium alkoxide, titanium hydroxide, titanium nitride, titanium sulfide, and metal titanium.

Specific examples of the titanium salt include titanium trichloride, titanium tetrachloride, titanium(IV) sulfide, titanium(VI) sulfide, and titanium(IV) sulfate. Specific examples of the titanium alkoxide include titanium(IV) ethoxide, titanium(IV) methoxide, titanium(IV) tert-butoxide, titanium (IV) isobutoxide, titanium(IV) n-propoxide, titanium(IV) tetraisopropoxide, and their chelate compounds.

In the present invention, as the titanium source powder, one kind may be used solely and two or more kinds may be used in combination.

Out of the substances, as the titanium source powder, a titanium oxide powder is preferably used and more preferably a titanium(IV) oxide powder is used. The titanium source powder may contain trace components derived from the raw materials or inevitably contained in the production process.

The particle diameter of the titanium source powder is not particularly limited, and generally, a titanium source powder to be used has a particle diameter corresponding to a cumulative percentage of 50% on a volume basis (D50) in a range of 0.1 to 25 μm, which is measured by laser diffractometry. In order to attain a sufficiently low firing shrinkage ratio, it is preferable to use a titanium source powder having D50 in a range of 1 to 20 μm. Note that a titanium source powder may sometimes exhibit a bimodal particle size distribution and in the case where a titanium source powder exhibiting such bimodal particle size distribution is used, the particle diameter of particles forming the peak of the larger particle diameter measured by laser diffractometry is preferably in a range of 20 to 50 μm.

The mode diameter of a titanium source powder measured by laser diffractometry is not particularly limited, and those in a range of 0.1 to 60 μm may be used.

In the present invention, the molar ratio of the aluminum source powder expressed on $Al_2O_3$ (alumina) basis to the titanium source powder expressed on $TiO_2$ (titania) basis in the starting material mixture is preferably in a range of 35/65 to 45/55 and more preferably in a range of 40/60 to 45/55. Use of an excess amount of the titanium source powder to the aluminum source powder within the range can efficiently lower the firing shrinkage ratio of a shaped body of the starting material mixture.

The starting material mixture may contain a magnesium source powder. In the case where the starting material mixture contains a magnesium source powder, an aluminum titanate-based ceramics fired body to be obtained is a fired body comprised of an aluminum magnesium titanate crystal. Examples of the magnesium source powder include a powder of magnesia (magnesium oxide) and also a powder of a substance to be led to magnesia by firing in the air. Examples of the substance to be led to magnesia by firing in the air include a magnesium salt, a magnesium alkoxide, magnesium hydroxide, magnesium nitride, and metal magnesium.

Specific examples of the magnesium salt include magnesium chloride, magnesium perchlorate, magnesium phosphate, magnesium pyrophosphate, magnesium oxalate, magnesium nitrate, magnesium carbonate, magnesium acetate, magnesium sulfate, magnesium citrate, magnesium lactate, magnesium stearate, magnesium salicylate, magnesium myristate, magnesium gluconate, magnesium dimethacrylate, and magnesium benzoate.

Specific examples of the magnesium alkoxide include magnesium methoxide and magnesium ethoxide. The magnesium source powder may contain trace components derived from the raw materials and inevitably contained in the production process.

As the magnesium source powder, a powder of a compound serving as the magnesium source and the aluminum source may also be used. Examples of such a compound include magnesia spinel ($MgAl_2O_4$). In the case where the powder of a compound serving as the magnesium source and the aluminum source is used as the magnesium source powder, the content thereof is controlled so as to adjust the molar ratio of the total amount of the aluminum source powder expressed on $Al_2O_3$ (alumina) basis and the Al component expressed on $Al_2O_3$ (alumina) basis contained in the powder of a compound serving as the magnesium source and the aluminum source, to the content of the titanium source powder expressed on $TiO_2$ (titania) basis, within the above-mentioned range in the starting material mixture.

In the present invention, as the magnesium source powder, one kind may be used solely and two or more kinds may be used in combination.

The particle diameter of the magnesium source powder is not particularly limited, and generally, a magnesium source powder to be used preferably has a particle diameter corresponding to a cumulative percentage of 50% on a volume basis (D50) in a range of 0.5 to 30 μm, which is measured by laser diffractometry. From the viewpoint of suppressing the firing shrinkage ratio of a starting material mixture shaped body, it is preferable to use a magnesium source powder having D50 in a range of 3 to 20 μm.

The content of the magnesium source powder expressed on MgO (magnesia) basis in the starting material mixture is, in a molar ratio, preferably 0.03 to 0.15, and more preferably 0.03 to 0.13, and even more preferably 0.03 to 0.12, relative to the total amount of the aluminum source powder expressed on $Al_2O_3$ (alumina) basis and the titanium source powder expressed on $TiO_2$ (titania) basis. By the adjustment of the content of the magnesium source powder within this range, an aluminum titanate-based ceramics fired body with improved heat resistance, large pore diameter and open porosity can be relatively easily obtained.

The starting material mixture may further contain a silicon source powder. The silicon source powder is a powder of a substance to be led to a silicon component contained in an aluminum titanate-based ceramics fired body. By using the silicon source powder in combination, an aluminum titanate-based fired body with further improved heat resistance can be obtained. Examples of the silicon source powder include powders of silicon oxides (silica) such as silicon dioxide and silicon monoxide.

The silicon source powder may be a powder of a substance to be led to silica by firing in the air. Examples of such a substance include a silicic acid, silicon carbide, silicon nitride, silicon sulfide, silicon tetrachloride, silicon acetate, sodium silicate, sodium orthosilicate, feldspar, and glass frit. Out of them, feldspar, glass frit and the like are preferably used, and from the viewpoint of easiness in industrial availability and composition stability, glass frit and the like are more preferably used. Note that glass frit means flaky or powdery glass obtained by pulverizing glass. A powder comprising a mixture of feldspar and glass frit is also preferably used as the silicon source powder.

In the case of using glass frit, glass frit having a deformation point of not lower than 700° C. is preferably used from the viewpoint of further improvement in heat decomposition resistance of an aluminum titanate-based ceramics fired body to be obtained. In the present invention, the deformation point of glass frit is defined as a temperature (° C.) at which expansion stops and subsequently shrinkage starts in the case where the expansion of the glass frit is measured by thermo mechanical analysis (TMA: Thermo Mechanical Analysis) by elevating temperature.

As glass constituting the glass frit, common silicate glass containing silicate ($SiO_2$) as a main component (more than 50% by mass in the entire components) may be used. The glass constituting the glass frit may further contain, as other components, such as alumina ($Al_2O_3$), sodium oxide ($Na_2O$), potassium oxide ($K_2O$), calcium oxide (CaO), and magnesia (MgO) and the like, similarly to common silicate glass. The glass constituting the glass frit may also contain $ZrO_2$ in order to improve the hot water resistance of the glass itself.

In the present invention, as the silicon source powder, one kind may be used solely and two or more kinds may be used in combination.

The particle diameter of the silicon source powder is not particularly limited, and generally, a silicon source powder to be used has a particle diameter corresponding to a cumulative percentage of 50% on a volume basis (D50) in a range of 0.5 to 30 μm, which is measured by laser diffractometry. In order to further improve the filling ratio of the shaped body of a starting material mixture and obtain a fired body with higher mechanical strength, it is more preferable to use a silicon source powder having D50 in a range of 1 to 20 μm.

In the case where the starting material mixture contains the silicon source powder, the content of the silicon source powder in the starting material mixture expressed on $SiO_2$ (silica) basis is generally 0.1 to 10 parts by mass and preferably not more than 5 parts by mass relative to 100 parts by mass of the total amount of the aluminum source powder expressed on $Al_2O_3$ (alumina) basis and the titanium source powder expressed on $TiO_2$ (titania) basis. The silicon source powder may contain trace components derived from the raw materials or inevitably contained in the production process.

In the present invention, similar to a composite oxide such as magnesia spinel ($MgAl_2O_4$), a compound having two or more metal elements as components out of titanium, aluminum, silicon, and magnesium may be used as a starting material powder. In this case, such a compound can be considered to be the same as a starting material mixture obtained by mixing respective metal source compounds. Based on the consideration, the contents of the aluminum source powder, the titanium source powder, the magnesium source powder, and the silicon source powder in the starting material mixture are adjusted in the above-mentioned ranges.

Further, the starting material mixture may contain aluminum titanate or aluminum magnesium titanate itself. In the case where aluminum magnesium titanate is used as a constitutive component of the starting material mixture, the aluminum magnesium titanate corresponds to a starting material serving as the titanium source, the aluminum source, and the magnesium source.

The starting material mixture in the present invention is further mixed with an additive (organic matter) such as a pore-forming agent, a binder, a lubricant, a plasticizer, a dispersant, and a solvent, for example.

Examples of the pore-forming agent include carbon materials such as graphite; resins such as polyethylene, polypropylene, and poly(methyl methacrylate); plant materials such as starch, nut shells, walnut shells, and corn; ice; and dry ice. Since polyethylene, corn starch, and potato starch have high heat generation quantity at the time of being combusted out of them, the production process of the present invention is particularly effective in the case of using polyethylene, corn starch, and potato starch as the pore-forming agent. The additive content of the pore-forming agent is generally 0 to 40 parts by mass and preferably 0 to 25 parts by mass relative to 100 parts by mass of the total amount of the aluminum source powder, the titanium source powder, the magnesium source powder, and the silicon source powder.

Examples of the binder include celluloses such as methyl cellulose, carboxylmethyl cellulose, and sodium carboxylmethyl cellulose; alcohols such as polyvinyl alcohol; salts such as lignin sulfonic acid salt; waxes such as paraffin wax and microcrystalline wax; and thermoplastic resins such as EVA, polyethylene, polystyrene, a liquid crystal polymer, and engineering plastic. The additive content of the binder is generally not higher than 20 parts by mass and preferably not higher than 15 parts by mass relative to 100 parts by mass of the total amount of the aluminum source powder, the titanium source powder, the magnesium source powder, and the silicon source powder.

Examples of the lubricant and the plasticizer include alcohols such as glycerin; higher fatty acids such as capric acid, lauric acid, palmitic acid, alginic acid, oleic acid, and stearic acid; and stearic acid metal salts such as aluminum stearate. The additive content of the lubricant and plasticizer is generally 0 to 10 parts by mass, preferably 1 to 7 parts by mass and more preferably 1 to 5 parts by mass relative to 100 parts by mass of the total amount of the aluminum source powder, the titanium source powder, the magnesium source powder, and the silicon source powder.

Examples of the dispersant include inorganic acids such as nitric acid, hydrochloric acid, and sulfuric acid; organic acids such as oxalic acid, citric acid, acetic acid, malic acid, and lactic acid; alcohols such as methanol, ethanol, and propanol; and surfactants such as ammonium polycarboxylate and polyoxyalkylene alkyl ether. The additive content of the dispersant is generally 0 to 20 parts by mass and preferably 2 to 8 parts by mass relative to 100 parts by mass of the total amount of the aluminum source powder, the titanium source powder, the magnesium source powder, and the silicon source powder.

Examples of the solvent include monohydric alcohols (methanol, ethanol, butanol, and propanol), glycols (propylene glycol, polypropylene glycol, and ethylene glycol, etc.), and water. Water is preferable out of the solvents and ion-exchanged water is more preferably used from the viewpoint of little impurities. The content of the solvent to be used is generally 10 to 100 parts by mass and preferably 20 to 80 parts by mass relative to 100 parts by mass of the total amount of the aluminum source powder, the titanium source powder, the magnesium source powder, and the silicon source powder.

The total amount of organic components such as the pore-forming agent, the binder, the lubricant, the plasticizer, the dispersant, and the solvent is preferably not less than 10 parts by mass and less than 50 parts by mass and more preferably not less than 15 parts by mass and not more than 30 parts by mass based on 100 parts by mass of the ceramics shaped body (the total amount of the inorganic components and organic components).

A starting material mixture to be provided for shaping may be obtained by mixing (kneading) inorganic components such as the aluminum source powder and the titanium source powder as well as the magnesium source powder and the silicon source powder to be used arbitrarily with various kinds of the above-mentioned organic components.

In the present invention, first a ceramics shaped body is obtained by shaping the starting material mixture containing inorganic components such as the aluminum source powder and the titanium source powder as well as the magnesium source powder and the silicon source powder to be used arbitrarily and the organic components (various kinds of additives), and next the obtained shaped body is subjected to a degreasing step and a firing step to obtain an aluminum titanate-based ceramics fired body. By carrying out firing after shaping, a porous aluminum titanate-based ceramics fired body comprising an aluminum titanate crystal can be obtained with maintained pore shapes.

The structure of the ceramics shaped body is not particularly limited and examples may include a honeycomb shape, a rod-like shape, a tubular shape, a plate-like shape, and a crucible-like shape. The honeycomb shape is particularly preferable out of them and the cross-sectional area of the bottom face of the shaped body is not less than 78.5 $cm^2$, and the height of the shaped body is not less than 5 cm in the arrangement during the degreasing step mentioned below. A larger shaped body compared with the above-mentioned size becomes easier to crack during the degreasing step, and therefore the effect of the production process of the present invention is particularly significant. A shaping machine used for shaping the starting material mixture into a ceramics shaped body include a uniaxial press machine, an extrusion shaping machine, a tableting machine, and a granulator.

(Degreasing Step)

In the present invention, the ceramics shaped body is subjected to the degreasing step before being subjected to the firing step in order to remove an organic component such as an organic binder contained in the ceramics shaped body (or starting material mixture). The degreasing step is carried out in atmosphere with an oxygen concentration of not higher than 0.1%. In this description, the unit "%" which is used as a unit of oxygen concentration means "% by volume". By controlling the oxygen concentration to be not higher than 0.1% during the degreasing step (at the time of heating), heat generation from organic substances is suppressed and thereby the cracking after degreasing can be suppressed. By carrying out degreasing with the oxygen concentration of not higher than 0.1%, a portion of organic components is removed and the remnant is carbonized to remain in the ceramics shaped body, during the degreasing step. Trace of carbon remains in the ceramics shaped body as described above, consequently the strength of the shaped body is increased and transfer of the ceramics shaped body to the firing step becomes easy. The example of the atmosphere for the degreasing step includes the atmosphere of inert gas such as nitrogen gas and argon gas; atmosphere of reducing gas such as carbon monoxide gas and hydrogen gas; and vacuum. The oxygen concentration may also be lowered by firing in the atmosphere with a decreased water vapor partial pressure or by steaming with charcoal.

The temperature condition during degreasing step is that the highest temperature is not lower than 700° C. and not higher than 1100° C., and more preferably not lower than 800° C. and not higher than 1000° C. By increasing the highest temperature during degreasing step from conventional 600 to 700° C. to the range of 700 to 1100° C., the mechanical strength of the ceramics shaped body after the degreasing step increases owing to grain growth, and transfer of the ceramics shaped body to the firing step becomes easy. During the degreasing step, the heating rate to the highest temperature is preferably suppressed as much as possible (for example, 5 to 150° C./hr) in order to prevent cracking of the ceramics shaped body. The heating rate means each heating rate in each heating step excluding the holding step.

The degreasing is generally carried out using the same furnace as that used for general firing, such as a tubular electric furnace, a box type electric furnace, a tunnel furnace, a far infrared furnace, a microwave heating furnace, a shaft furnace, a reverberating furnace, a rotary furnace, a roller hearth furnace, and a gas-fired furnace. The degreasing may be carried out in a batch manner or in a continuous manner. The degreasing may also be carried out in a static manner or in a fluidization manner.

During the degreasing step, it is preferable to keep the ceramics shaped body at the highest temperature (not lower than 700° C. and not higher than 1100° C.) mentioned above. The time required for the degreasing may be sufficient if it is sufficient to combust a portion of the organic components contained in the ceramics shaped body, and preferably to combust not less than 90% by mass and not more than 99% by mass of the organic components contained in the ceramics shaped body (that is, the total of the organic components contained in the starting material mixture). Specifically, the time for keeping the ceramics shaped body at the highest temperature depends on the amount of the starting material mixture, the model of the furnace to be employed for the degreasing, the temperature condition, and the atmosphere, and the time is generally 1 minute to 10 hours and preferably 1 to 7 hours. After being kept at the highest temperature, the ceramics shaped body may be cooled to room temperature (for example, 20° C. to 25° C.) and the cooling rate is, for example, 70 to 120° C./hr.

(Firing Step)

In the present invention, the ceramics shaped body is subjected to a firing step after the degreasing step. The highest temperature during the firing step (firing temperature) is generally not lower than 1300° C. and preferably not lower than 1400° C. The firing temperature is generally not higher than 1650° C., and preferably not higher than 1550° C. The heating rate to the firing temperature is not particularly limited and is generally 1° C./h to 500° C./h. In the case where the silicon source powder is used, it is preferable to set a step of keeping the shaped body in a temperature range of 1100 to 1300° C. for not shorter than 3 hours before the firing step. This process can accelerate melting and diffusion of the silicon source powder.

During the firing step of the present invention, heating up to 1300° C. is carried out in atmosphere with an oxygen concentration of not lower than 1% and not higher than 6%. By controlling the oxygen concentration to be not higher than 6%, combustion of the remaining carbides generated during the degreasing step can be suppressed, and accordingly cracking hardly occurs in the ceramics shaped body during the firing step. Further, since a proper amount of oxygen exists, the organic components can be completely removed out from the aluminum titanate-based ceramics fired body to be obtained finally. However, in the case where firing is carried out in the atmosphere with an oxygen concentration of less than 1%, the carbides (soot) of the organic components may possibly remain in the aluminum titanate-based ceramics fired body to be obtained in some cases. Depending on the types and the content ratios of the starting material powders to be used (that is, the aluminum source powder, the titanium source powder, the magnesium source powder, and the silicon source powder), the firing may be carried out in inert gas such as nitrogen gas and argon gas or in reducing gas such as carbon monoxide gas and hydrogen gas. Further, the firing may be carried out in the atmosphere with a decreased water vapor partial pressure.

Further, it is preferable that the firing (keeping at the highest temperature) is carried out in atmosphere with an oxygen concentration higher than 5% after heating up to 1300° C. Note that in the case where the firing temperature (that is, the highest temperature) is higher than 1300° C., the atmosphere from 1300° C. to the firing temperature may be atmosphere with an oxygen concentration of not lower than 1% and not higher than 6%, or higher than 5%.

For the firing, the same firing furnace as the furnace used for the degreasing may be used. The firing may be carried out in a batch manner or in a continuous manner. The firing may also be carried out in a static manner or in a fluidization manner.

The time required for the firing, specifically the keeping time at the firing temperature (highest temperature), is sufficient if it is sufficient to transit the shaped body of the starting material mixture into an aluminum titanate-based crystal. The time required for the firing differs depending on the amount of the starting material mixture, the model of the firing furnace, the firing temperature, and the firing atmosphere, and it is generally 10 minutes to 24 hours.

In the above-mentioned manner, the intended aluminum titanate-based ceramics fired body can be obtained. Such an aluminum titanate-based ceramics fired body has the maintained structure that is in approximately the same shape as that of the shaped body immediately after shaping. The obtained aluminum titanate-based ceramics fired body may be processed to have a desired shape by grinding processing and the like.

The aluminum titanate-based ceramics fired body obtained according to the present invention may contain crystal patterns of alumina and titania as well as the crystal patterns of aluminum titanate and aluminum magnesium titanate in an x-ray spectrum. In the case where the aluminum titanate-based ceramics fired body of the present invention contains an aluminum magnesium titanate crystal, it can be defined by the composition formula: $Al_{2(1-x)}Mg_xTi_{(1+x)}O_5$ in which the value for x is not lower than 0.03, preferably not lower than 0.03 and not higher than 0.15, and more preferably not lower than 0.03 and not higher than 0.12. The aluminum titanate-based ceramics fired body obtained according to the present invention may further contain trace components derived from the raw materials or inevitably contained in the production process.

The aluminum titanate-based ceramics fired body of the present invention is a porous ceramics mainly containing an aluminum titanate-based crystal. "Mainly containing an aluminum titanate-based crystal" means that the main crystal phase constituting the aluminum titanate-based ceramics fired body is an aluminum titanate-based crystal phase (for example, not less than 80% of aluminum titanate-based crystal phase) and the aluminum titanate-based crystal phase may be, for example, the aluminum titanate crystal phase and the aluminum magnesium titanate crystal phase.

The aluminum titanate-based ceramics fired body of the present invention may contain a phase (crystal phase) other than the aluminum titanate-based crystal phase. Examples of the phase (crystal phase) other than the aluminum titanate-based crystal phase include phases derived from starting materials used for producing the aluminum titanate-based ceramics fired body. The phases derived from starting materials include, more specifically, phases derived from the aluminum source powder, the titanium source powder, and/or the magnesium source powder remaining without being led to the aluminum titanate-based crystal phase in the case of producing an aluminum titanate-based ceramics fired body by the production process of the present invention. In the case where the starting material mixture contains the silicon source powder, the aluminum titanate-based ceramics fired body further contains a phase derived from the silicon source powder such as a glass phase containing a $SiO_2$ component.

The structure of the aluminum titanate-based ceramics fired body of the present invention is not particularly limited and may be a honeycomb-like shape, a rod-like shape, a tubular shape, a plate-like (sheet-like) shape, and a crucible-like shape. In the case of being used as a ceramics filter such as DPF, the aluminum titanate-based ceramics fired body of the present invention is preferable to be shaped in a honeycomb structure.

In the case where the aluminum titanate-based ceramics fired body is used for a ceramics filter such as DPF and the like, it becomes possible by controlling the open porosity of the aluminum titanate-based ceramics fired body to be not lower than 35% to obtain a ceramics filter with an improved collecting capacity (adsorption capacity) of object to be collected such as diesel particulate and also lowered pressure drop of gas to be treated with the filter (exhaust gases discharged from a diesel engine, and the like) and thus excellent filter performances. The upper limit of the open porosity of the aluminum titanate-based ceramics fired body is not particularly limited and may be lower than about 45%, for example. The open porosity of the ceramics fired body may be measured by an Archimedes method of immersing the fired body in water.

The aluminum titanate-based ceramics fired body of the present invention may contain a glass phase. The glass phase refers to an amorphous phase containing $SiO_2$ as a main component. In this case, the content of the glass phase is preferably not higher than 5% by mass and preferably not lower than 2% by mass. It becomes easy by containing not more than 5% by mass of a glass phase to obtain an aluminum titanate-based ceramics fired body satisfying the pore characteristics required for a ceramics filter such as DPF.

The process for producing an aluminum titanate-based ceramics fired body may preferably be employed for producing the aluminum titanate-based ceramics fired body of the present invention having the above-mentioned pore characteristics and mainly containing an aluminum titanate crystal. That is, the aluminum titanate-based ceramics fired body of the present invention can be obtained by obtaining a shaped body by shaping a starting material mixture containing the aluminum source powder and the titanium source powder as well as the magnesium source powder and the silicon source powder to be used arbitrarily and then firing the shaped body.

The aluminum titanate-based ceramics fired body obtained by this process is an aluminum titanate-based ceramics fired body mainly containing an aluminum titanate-based crystal.

In order to impart the pore characteristics to the aluminum titanate-based ceramics fired body, the starting material mixture preferably contains the silicon source powder. The above-mentioned substances may be used as the silicon source powder and particularly, glass frit, feldspar and their mixture are preferably used. In order to impart the above-mentioned pore characteristics to the aluminum titanate-based ceramics fired body, the content of the silicon source powder in the inorganic components contained in the starting material mixture is preferably adjusted to be not lower than 2% by mass and not higher than 5% by mass. The inorganic components contained in the starting material mixture contains the elements constituting the aluminum titanate-based ceramics fired body and are typically the aluminum source powder, the titanium source powder, the magnesium source powder, and the silicon source powder. In the case where the organic components (additives such as a pore-forming agent, a binder, a lubricant, a plasticizer, and a dispersant) contained in the starting material mixture contains inorganic components, the inorganic components are also included.

In order to impart the pore characteristics to the aluminum titanate-based ceramics fired body, the starting material mixture preferably contains the magnesium source powder. A preferable content of the magnesium source powder in the starting material mixture is as described above.

EXAMPLES

Hereinafter, the present invention will be described in more detail with reference to examples; however the present invention should not be limited to these examples.

(1) Particle Diameter Distribution of Starting Material Powder

A particle diameter corresponding to a cumulative percentage of 10% on a volume basis (D10), a particle diameter corresponding to a cumulative percentage of 50% on a volume basis (D50), and a particle diameter corresponding to a cumulative percentage of 90% on a volume basis (D90) of a starting material powder were measured by laser diffraction type particle size distribution measurement (Microtrac HRA (X-100), manufactured by Nikkiso Co. Ltd.).

(2) Firing Shrinkage Ratio

The values of the length of a shaped body in a honeycomb structure before degreasing (after extrusion shaping) and that of a shaped body after degreasing and firing were measured for each at two points in the direction of an extruded cross section (cross section of shaped body in the direction perpendicular to extrusion direction). These values were averaged for each, and provided for the calculation of the firing shrinkage ratio as the average length after extrusion shaping and before degreasing (average length before firing), and the average length after firing (average length after firing). The firing shrinkage ratio was calculated according to the following formula.

Firing shrinkage ratio(%)={1−(average length after firing)/(average length before firing)}×100

Example 1

The following materials were provided as starting material powders.

(1) Aluminum Source Powder

Aluminum oxide powder (α-alumina powder) with a median particle diameter (D50) of 29 μm 25.23 parts by mass (2) Titanium Source Powder
Titanium oxide powder (rutile type crystal) with D50 of 1.0 μm
43.00 parts by mass
(3) Magnesium Source Powder
Magnesium spinel powder with D50 of 5.5 μm
16.06 parts by mass
(4) Silicon Source Powder
Glass frit with D50 of 8.5 μm (CK0832, manufactured by Takara Standard)
3.51 parts by mass
(5) Pore-Forming Agent (Polyethylene Powder)
12.20 parts by mass The mixture of the aluminum source powder, the titanium source powder, magnesium source powder, silicon source powder, and the pore-forming agent (polyethylene powder) was prepared as 100 parts by mass and added by 5.49 parts by mass of methyl cellulose and 2.35 parts by mass of hydroxypropyl methyl cellulose as binders, 0.40 parts by mass of glycerin and 4.64 parts by mass of Unilube as lubricants, and 29.22 parts by mass of water as a dispersion medium, and kneaded with a kneader to provide a green body (starting material mixture for shaping). The green body was then extrusion-shaped to prepare a honeycomb ceramics shaped body (cell density of 300 cpsi, cell wall thickness of 0.3 mm) having a column-like shape with a diameter of 160 mm and a height of 260 mm as well as a large number of through holes in the height direction. The respective starting material components are listed in Table 1. Note that the mode diameter of titanium(IV) oxide was about 1 μm.

TABLE 1

| | Precursor mixture | Median particle diameters (μm) | Content (parts by mass) |
|---|---|---|---|
| Starting material powder | Titanium oxide (IV) | 1 | 43.00 |
| | α-alumina powder | 29 | 25.23 |
| | Magnesia spinel powder | 5.5 | 16.06 |
| | Glass frit | 8.5 | 3.51 |
| Pore-forming agent | Polyethylene powder | — | 12.20 |
| binder | Methyl cellulose | — | 5.49 |
| | Hydroxypropyl methyl cellulose | — | 2.35 |
| lubricant | Unilube (registered trademark) | — | 4.64 |
| | Glycerin | — | 0.40 |

In Table 1, Unilube (registered trademark) is a polyoxyalkylene type compound manufactured by Nippon Oil & Fats Co., Ltd. All of the pore-forming agent, the binder, and the lubricant in Table 1 were components (organic substances) combusted by firing. The content of the titanium source powder expressed on titania basis was 49.0 parts by mass; the content of the aluminum source powder expressed on alumina basis was 41.8 parts by mass; the content of the magnesium source powder expressed on magnesia basis was 5.2 parts by mass; and the content of the silicon source powder expressed on silica (that is, the $SiO_2$ component in glass frit was 100% by mass) basis was 4.0 parts by mass in 100 parts by mass of the total amount of the components excluding the above-mentioned components to be removed by firing (that is, the starting material powder) out of the starting material components listed in Table 1.

The obtained honeycomb shaped body was dried by microwave drying for 10 minutes with the output power adjusted to be about 1 W/1 g depending on the weight of a sample. The size of the shaped body shrank to be about 150 mm of diameter by the drying. The dried honeycomb shaped body was cut in a height of 215 mm. The weight was 2970 g.

(Degreasing Step)

Next, the ceramics shaped body was subjected to degreasing step for removing organic substances (degreasing) contained thereof. First, an un-fired ceramics shaped body was heated to 110° C. in nitrogen atmosphere with an oxygen concentration of not more than 0.1% by volume and kept for 4 hours, thereafter heated to 170° C. at a heating rate of 7° C./hr and kept for 4 hours. Thereafter, the ceramics shaped body was heated to 900° C. at a heating rate of 7 to 20° C./hr and kept for 4 hours. Thereafter, the shaped body was cooled to 20° C. at a cooling rate of 100° C./hr. The degreasing step provide a black colored ceramics shaped body containing un-fired substances (carbides) of the organic substances remaining in about 0.5% by mass in the wet weight (that is, the total weight of the ceramics shaped body after degreasing step) (consequently, about 98.2% by mass of the organic components contained in the starting material mixture were removed). No cracking occurred in all specimens (5 specimens) of the obtained black colored ceramics shaped body. The crushing strength of the honeycomb ceramics shaped body (diameter of 25.4 mm, cell density of 300 cpsi, cell wall thickness of 0.3 mm) after the degreasing step was measured to find 1 N (Newton).

(Firing Step)

Next, the black colored ceramics shaped body containing about 0.5% by mass of the remaining un-fired organic substances was heated to 900° C. at a heating rate of 50° C./hr in atmosphere with an oxygen concentration of 2% by volume and kept for 5 hours. Thereafter, the ceramics shaped body was heated to about 1300° C. at a heating rate of 20° C./hr; the oxygen concentration was changed to be 21% by volume; and the ceramics shaped body was heated to 1500° C. at a heating rate of 20° C./hr, and kept for 5 hours. Thereafter, the temperature was lowered at 100° C./hr to obtain one piece of aluminum titanate-based ceramics fired body.

During the degreasing step and firing step in this Example, 30 to 50 g of $ZrO_2$ beads with a diameter of 0.3 mm were laid on a mullite floor plate and the honeycomb shaped body was set, and degreased and fired. The friction coefficient when the shaped body was slipped while laying 30 to 50 g of $ZrO_2$ beads with a diameter of 0.3 mm on a mullite floor plate was about $1\times10^{-3}$ N for 1 g of the shaped body.

Example 2

An aluminum titanate-based ceramics fired body was obtained in the same manner as that in Example 1, except that the heating profile during the degreasing step was changed as described below.

(Degreasing Step)

At first, an un-fired ceramics shaped body was heated to 170° C. at a heating rate of 50° C./hr in nitrogen atmosphere with an oxygen concentration of not more than 0.1% by volume, thereafter heated to 600° C. at a heating rate of 30° C./hr, and successively heated to 1000° C. at a heating rate of 50° C./hr, and kept for 4 hours. Thereafter, the shaped body was cooled to 20° C. at a cooling rate of 100° C./hr. The crushing strength of the honeycomb ceramics shaped body (diameter of 25.4 mm, cell density of 300 cpsi, cell wall thickness of 0.3 mm) after the degreasing step was measured to find 1 N (Newton).

The aluminum titanate-based ceramics fired bodies obtained in Examples 1 and 2 were ground in a mortar and the diffractometric spectra of the obtained powders were measured by powder x-ray diffractometry to find that both powders exhibited a crystal peak of aluminum magnesium titanate. The firing shrinkage ratio of the ceramics shaped body obtained by shaping the starting material mixture was 9%. In the case where the aluminum titanate-based ceramics fired bodies of Examples 1 and 2 were defined by the composition formula: $Al_{2(1-x)}Mg_xTi_{(1+x)}O_5$, the value for x was 0.12 for both.

Comparative Example 1

A honeycomb ceramics shaped body was produced in the same manner as that in Example 1 and the degreasing step was carried out by changing the heating profile as follows. Note that all specimens (4 specimens) of the ceramics shaped body were cracked after the degreasing step, and no firing step was carried out thereafter.

(Degreasing Step)

First, an un-fired ceramics shaped body was heated to 110° C. in nitrogen atmosphere with an oxygen concentration of 1% and kept for 4 hours, thereafter heated to 170° C. at a heating rate of 10° C./hr and kept for 4 hours. Thereafter, the ceramics shaped body was heated to 550° C. at a heating rate of 7 to 20° C./hr and kept for 12 hours. Thereafter, the shaped body was cooled to 20° C. at a rate of 30 to 100° C./hr.

Comparative Example 2

A honeycomb ceramics shaped body was produced in the same manner as that in Example 1, except that the oxygen concentration was changed to 1% by volume during the degreasing step, and then the degreasing step same as that in Example 2 was carried out. Note that all specimens (5 specimens) of the ceramics shaped body were cracked after the degreasing step, and no firing step was carried out thereafter.

Comparative Example 3

A honeycomb ceramics shaped body was produced in the same manner as that in Example 1, except that the oxygen concentration was changed to be 2% by volume during the degreasing step, and then the degreasing step same as that in Example 2 was carried out. Additionally, all specimens (5 specimens) of the ceramics shaped body were cracked after the degreasing step, and no firing step was carried out thereafter.

The results of Examples 1 and 2 and Comparative Examples 1 to 3 are collectively listed in Table 2.

TABLE 2

| | Degreasing step condition | | | |
|---|---|---|---|---|
| | The highest temperature | Time for keeping at the highest temperature | Oxygen concentration | State of cracks |
| Example 1 | 900° C. | 4 hours | Not more than 0.1% | No cracks |
| Example 2 | 1000° C. | 4 hours | Not more than 0.1% | No cracks |
| Comparative Example 1 | 550° C. | 12 hours | 1% | Cracked |
| Comparative Example 2 | 1000° C. | 4 hours | 1% | Cracked |
| Comparative Example 3 | 1000° C. | 4 hours | 2% | Cracked |

In Comparative Examples 1 to 3, all of the specimens of the ceramics shaped bodies were cracked after the degreasing step and on the other hand, in Examples, none of the specimens of the ceramics shaped bodies was cracked after the degreasing step.

It should be understood that the embodiments and examples disclosed herein are illustrative and are not restrictive in all respects. The scope of the present invention is not shown by the description described above, but is shown by the claims, and it is intended to comprise all modifications in the meaning and in the range of claims-equivalent.

INDUSTRIAL APPLICABILITY

The aluminum titanate-based ceramics fired body obtained by the present invention may be preferably used in tools for a firing furnace such as a crucible, a setter, a sagger, and a refractory lining; exhaust gas filters and catalyst carriers to be used in exhaust gas purification for an internal combustion engine such as a diesel engine and a gasoline engine; filtration filters to be used in filtration of beverage such as beer; ceramics filters such as a filter with permselectivity for selectively permeating gas components generated at the time of petroleum refining, for example, carbon monoxide, carbon dioxide, nitrogen, and oxygen; and electronic parts such as a substrate and a capacitor. In the case of being used particularly as a ceramics filter, the aluminum titanate-based ceramics fired body of the present invention has a high pore volume and open porosity and therefore can retain a good filter capacity for a long duration.

The invention claimed is:

1. A process for producing an aluminum titanate-based ceramics fired body comprising a shaping step to obtain a ceramics shaped body comprising shaping a starting material mixture containing inorganic components comprising an aluminum source powder and a titanium source powder and organic components;
   a degreasing step comprising removing the organic components contained in the ceramics shaped body in an atmosphere with an oxygen concentration of not higher than 0.1% and under the temperature condition that the highest temperature is not lower than 700° C. and not higher than 1100° C.; and
   a firing step comprising firing the ceramics shaped body under the temperature condition that the highest temperature is not lower than 1300° C.; in this order,
   wherein the atmosphere at a heating step to 1300° C. during the firing step has an oxygen concentration of not lower than 1% and not higher than 6%.

2. The process according to claim 1, wherein the ceramics shaped body is kept at the highest temperature for the degreasing step during the degreasing step and the ceramics shaped body is kept at the highest temperature for the firing step during the firing step.

3. The process according to claim 1, wherein the ceramics shaped body is fired in the atmosphere with an oxygen concentration higher than 5% after the heating step to 1300° C. during the firing step.

4. The process according to claim 1, wherein the inorganic components further contain a magnesium source powder.

5. The process according to claim 4, wherein the molar ratio of the magnesium source powder expressed on MgO basis to the total amount of the aluminum source powder expressed on $Al_2O_3$ basis and the titanium source powder expressed on $TiO_2$ basis is 0.03 to 0.15.

6. The process according to claim 1, wherein the inorganic components further contain a silicon source powder.

7. The process according to claim 6, wherein the content of the silicon source powder expressed on $SiO_2$ basis relative to 100 parts by mass of the total amount of the aluminum source powder expressed on $Al_2O_3$ basis and the titanium source powder expressed on $TiO_2$ basis is 0.1 to 10 parts by mass.

8. The process according to claim 1, wherein the total amount of the organic components contained in the ceramics shaped body is not less than 10 parts by mass and less than 50 parts by mass based on 100 parts by mass of the total ceramics shaped body.

9. The process according to claim 1, wherein the organic components contain a pore-forming agent.

10. The process according to claim 9, wherein the pore-forming agent is polyethylene, corn starch, or potato starch.

11. The process according to claim 1, wherein the ceramics shaped body is in honeycomb structure and the cross-sectional area of a bottom face of the honeycomb structure is not smaller than 78.5 $cm^2$ and the height of the honeycomb structure is not lower than 5 cm during the degreasing step.

12. The process according to claim 1, wherein a portion of the organic components is removed and the remaining portion is carbonized during the degreasing step.

13. The process according to claim 1, wherein the molar ratio of the aluminum source powder expressed on $Al_2O_3$ basis to the titanium source powder expressed on $TiO_2$ basis is 35/65 to 45/55.

* * * * *